(12) United States Patent
Flamanc et al.

(10) Patent No.: US 8,519,339 B2
(45) Date of Patent: Aug. 27, 2013

(54) RARE-EARTH HALIDE SCINTILLATOR COATED WITH A LIGHT ABSORBER OR LIGHT REFLECTOR

(75) Inventors: Jeremy Flamanc, Fontainebleau (FR); Peter R. Menge, Chagrin Falls, OH (US)

(73) Assignee: Saint-Gobain Cristaux et Detecteurs, Courbevoie (FR)

( * ) Notice: Subject to any disclaimer, the term of this patent is extended or adjusted under 35 U.S.C. 154(b) by 308 days.

(21) Appl. No.: 12/833,905

(22) Filed: Jul. 9, 2010

(65) Prior Publication Data

US 2011/0017911 A1    Jan. 27, 2011

(30) Foreign Application Priority Data

Jul. 21, 2009  (FR) ...................... 09 55063

(51) Int. Cl.
*G01T 1/20* (2006.01)

(52) U.S. Cl.
USPC ...................................... 250/361 R

(58) Field of Classification Search
USPC ...................................... 250/361 R
See application file for complete search history.

(56) References Cited

U.S. PATENT DOCUMENTS

| | | | |
|---|---|---|---|
| 3,745,359 A | 7/1973 | Martone | |
| 4,563,584 A | 1/1986 | Hoffman et al. | |
| 4,870,279 A | 9/1989 | Cueman et al. | |
| 4,982,095 A | 1/1991 | Takahashi et al. | |
| 5,171,996 A | 12/1992 | Perez-Mendez | |
| 5,276,328 A | 1/1994 | Yoshida et al. | |
| 5,386,122 A * | 1/1995 | Yoshida et al. | 250/368 |
| 5,427,817 A | 6/1995 | Goodman et al. | |
| 5,536,323 A | 7/1996 | Kirlin et al. | |
| 5,781,131 A | 7/1998 | Kusuyama et al. | |
| 6,452,186 B1 | 9/2002 | Wieczorek et al. | |
| 6,468,305 B1 | 10/2002 | Otte | |
| 6,720,026 B2 | 4/2004 | Fuchs et al. | |
| 6,933,502 B2 | 8/2005 | Okada et al. | |
| 7,019,304 B2 | 3/2006 | Albagli et al. | |
| 7,084,403 B2 | 8/2006 | Srivastava et al. | |
| 7,180,068 B1 | 2/2007 | Brecher et al. | |
| 7,608,201 B2 | 10/2009 | Iltis | |
| 2002/0181647 A1 | 12/2002 | Venkataramani et al. | |
| 2005/0072931 A1 | 4/2005 | Albagli et al. | |
| 2005/0082484 A1 | 4/2005 | Srivastava et al. | |
| 2007/0272867 A1 | 11/2007 | Tahon et al. | |
| 2008/0308739 A1 | 12/2008 | Sawada et al. | |
| 2009/0008561 A1 * | 1/2009 | Nagarkar et al. | 250/361 R |

FOREIGN PATENT DOCUMENTS

| | | |
|---|---|---|
| JP | 62-24174 A | 2/1987 |
| JP | 1-191087 A | 8/1989 |
| JP | 2208591 A | 8/1990 |
| JP | 3010188 A | 1/1991 |
| WO | 2005/103760 A1 | 11/2005 |

* cited by examiner

*Primary Examiner* — David Porta
*Assistant Examiner* — Hugh H Maupin
(74) *Attorney, Agent, or Firm* — Abel Law Group, LLP

(57) ABSTRACT

A scintillator material comprises a rare-earth halide coated with a layer comprising a resin and a pigment. In an embodiment, the scintillator material is used in an ionizing-radiation detector, and in particular embodiment, a gamma camera. The layer can adhere well and act as an absorbent or reflector depending on the color of the pigment.

61 Claims, 1 Drawing Sheet

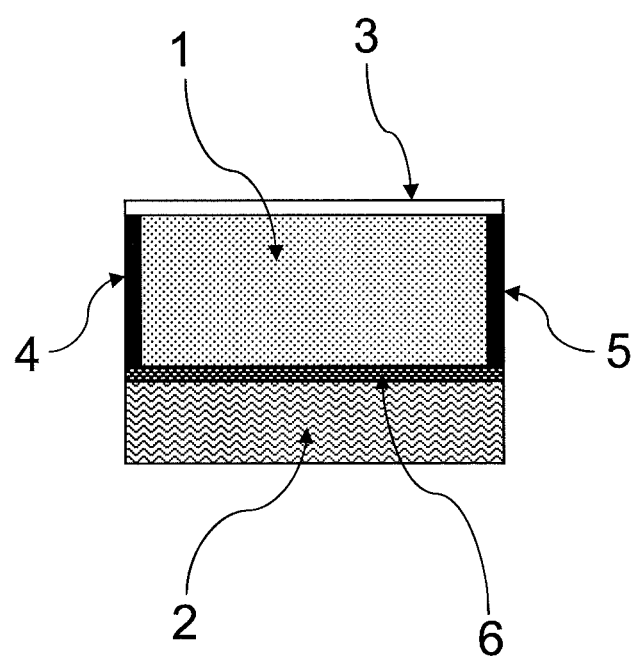

RARE-EARTH HALIDE SCINTILLATOR COATED WITH A LIGHT ABSORBER OR LIGHT REFLECTOR

CROSS-REFERENCE TO RELATED APPLICATION

The present application claims priority under 35 U.S.C. §119 to French Patent Application No. 0955063, filed Jul. 21, 2009, which application is incorporated by reference herein in its entirety.

BACKGROUND

The specification relates to the field of scintillator materials, potentially for use in radiation detectors.

Scintillator materials are used to detect and to measure the energy of ionizing radiation. They are mounted in systems that comprise the scintillator (often a hygroscopic crystal), a housing which may especially be made of aluminum. One of the faces of the crystal is coupled to a photodetector by direct coupling or prior coupling of a glass window which is then coupled to the photodetector. Any coupling may be carried out by a grease or an adhesive, of silicone or epoxy type. The greater the amount of light reaching the photodetector, the better the performance is from the point of view of the energy resolution and the detection threshold, and the less sensitive the photodetector needs to be. The scintillator is usually covered with a reflecting material that scatters the light (polytetrafluoroethylene (PTFE) film, for example) in order to reflect the scintillator the light that tends to exit via its faces covered with said reflecting material. The light can therefore only exit via the face that is not covered and that is coupled to the photodetector, wherein the photodetector then collects the light. Detectors that are thus equipped, in particular photodetectors having rare-earth halide single crystals, are particularly suitable for the identification and characterization (energy, flux, chronometry) of ionizing radiation.

Ionizing-radiation detectors are also used for carrying out imaging, for example, in the case of gamma cameras. Overall, they function along the same principles; however, a ionizing-radiation detector should forego collecting the light that escapes via the side faces since this light amplifies the distortion of the image (deformation phenomenon) and degrades the spatial resolution (blurredness phenomenon).

In order to eliminate this light that is at first misdirected within the scintillator, instead of providing the scintillator with a reflecting material, its lateral faces are covered with an absorbing material that is as black as possible. The face opposite the one that is in front of the photodetector may remain covered with a back-scattering material (such as PTFE). To achieve this absorption of the light on the lateral faces, there are a priori the following alternatives:
  a) adhere a black material such as paper or a strip of plastic to the faces of the scintillator; and
  b) do not cover the faces of the crystal, but use a housing that has been colored black on the inside, for example by using a black anodized housing.

The attempts at solutions have a significant drawback: the light is not absorbed immediately on the surface of the crystal but after the adhesive material in case a), and inside the housing in case b). This leads to an incomplete absorption of the light and some of this light may, after all, diffuse into the crystal.

BRIEF DESCRIPTION OF THE FIGURE

FIG. 1 includes an illustration of a cross-sectional view of a portion of a detector in accordance with an embodiment.

DETAILED DESCRIPTION

A scintillator material can comprise a rare-earth halide coated with a layer comprising a resin and a pigment. In one embodiment the resin comprises a thermosetting resin. In a particular embodiment, the resin comprises epoxy of silicone, such as polysiloxane. Depending on the desired use for the layer, the pigment may be of a different color, such as black or white depending on whether absorbency or reflectivity is desired. In another embodiment, the pigment may be of any color and may be a mixture of pigments. The pigment may therefore be white, if it is desired to reflect the light, instead of absorbing it. For particular applications, a mixture of a white pigment and a black pigment may be used for the purpose of obtaining a compromise of properties. The pigment may be added to the resin in the form of solid particles. In an embodiment, the layer adheres well to the rare-earth halide and does not significantly adversely affect the rare-earth halide.

Before addressing the details of particular embodiments, conventional materials and techniques are briefly addressed. An ionizing-radiation detector can have a scintillator material with its lateral surfaces painted with black paint.

Although light is more effectively absorbed by a black painted surface, as compared to unpainted surfaces, the paint may interact with the crystals by chemical or physical reaction, which then makes them unsuitable. Furthermore, it has been discovered that a black paint is much more absorbent when it is applied to a polished surface (of optical quality) rather than a rough surface. However, the quality of a polished surface of a hygroscopic scintillator (in particular a rare-earth halide) is very easily impaired in contact with a material which is not completely inert. For example, a coating which contains a moisture content greater than a few hundreds of ppm is not completely inert, and substantially degrades a polished finish over time.

After having tested various paints on a rare-earth halide, it was realized that these layers impair or even destroy the surface of the scintillator. Without this interpretation being able to limit the invention, the hygroscopic nature (even partially only) of these paints may be a source of this problem. The layer may interact with the scintillator, and dissolve it at the location of the contact. In the extreme case, the layer etches into the scintillator, which ultimately can cause a loss of its mechanical strength and its crystalline nature. This occurs, for example, with high-temperature black paint sold by KRYLON™-brand or the SPECTRALON PREMIX 6080™-brand white paint from Labsphere which is based on barium sulfate, frequently used in optical applications to obtain diffuse surfaces. The data sheets of these two paints emphasize the roughness to be imparted to the substrate before application.

A simple alteration of the area of contact between the layer and the scintillator may eliminate the advantage of having a nearby absorber.

In an embodiment of the present invention, a mixture of an adhesive anhydrous resin, especially a thermosetting resin of the epoxy or silicone type, with a pigment (which encompasses a mixture of various pigments) is prepared. The pigment is chosen depending on whether it is desired to make a reflective or absorbent coating. When a reflective coating is desired, the pigment may be white, such as pulverulent titanium oxide or pulverulent barium sulfate. When an absorbent coating is desired, the pigment may be carbon black. Furthermore, such a coating protects the surface of the scintillator against hydration or any other chemical attack. The coating is adhesive so that once set, it does not detach from the scintillator, even in the case of variation in temperature or impact, or vibration.

Depending on the opacity which is desired, the mixture can be loaded with pigment to a greater or lesser extent. The pigment may be weakly concentrated enough in order to allow some of the light to pass through the layer. Thus, the layer may be partially transparent. When a good absorbent nature or a good reflecting nature is desired, a sufficient amount of pigment is introduced into the mixture in order to obtain the desired opacity, which may depend on the nature of the filler. Whatever the pigment, approximately 0.01 to 20% by weight of pulverulent pigment is put into the mixture. In the case of carbon black, an excellent opacity is obtained, in particular, for 2% by weight of carbon black. The resin/pigment mixture (and also the coating that derives therefrom) is substantially free of water (less than 1% by weight of water and preferably less than 100 ppm of water by weight) and of any component that is not inert with respect to the scintillator to be treated.

This mixture is stirred for a sufficiently long time in order to be homogeneous, and sufficiently slowly in order not to incorporate air bubbles which could contain moisture, and could also induce a refraction surface between the scintillator and the layer. The mixture is then degassed (for example in a vacuum chamber) in order to extract the last residual bubbles.

The resin is then left to thicken slightly (before application to the crystal). In particular embodiments, resins that thicken or solidify in ambient air are used. These are generally two- or three-component resins that react together to set as soon as they are mixed, also known as thermosetting resins. This setting can be accelerated by heating the resin for one to several hours at a temperature between 60° C. and 150° C. (depending on the type of resin). This treatment facilitates the application since it makes it possible to thicken the mixture somewhat, and give it a suitable viscosity. This better consistency prevents the mixture from running off the surface of the scintillator after having been applied thereto.

Once the coating is applied, it is left to finish cross-linking in dry air (since the scintillator is hygroscopic). The cross-linking may be accelerated by heating at a temperature up to 150° C. (depending on the type of resin and scintillator). The final layer can have a thickness between 10 µm and 5 mm.

A process for manufacturing the scintillator material can include the application of a homogeneous mixture of an adhesive resin and of a pigment to the surface of the scintillator material containing less than 1% by weight of water, or even less than 100 ppm of water by weight.

The scintillator material comprises a rare-earth halide. The expression "rare earth" is understood to mean an element taken from Y, Sc and the series of lanthanides from La to Lu and more particularly from Y, La, Gd, Lu, or a mixture of these elements. The scintillator material is generally in the form of a single crystal. It may be of a formula $A_nLn_pX_{(3p+n)}$ in which Ln represents one or more rare-earth elements, X represents one or more halogen atoms chosen from Cl, Br, I and A represents one or more alkali metals such as Li, Na, K, Rb or Cs, n and p are numbers such that n is greater than or equal to zero and less than or equal to 3 and p is greater than or equal to 1. In particular, the material may be of formula $A_nLn_{(p-x)}Ln'_xX_{(3p+n)}$ in which Ln represents one or more rare-earth elements, Ln' is a doping element, that is to say a rare-earth element and more particularly an element chosen from Ce, Pr and Eu, x is a number greater than or equal to 0.0005 and less than p.

Examples of such materials, particularly in single-crystal form, are:

$LaCl_3$, which may be doped with 0.1 to 50 mol % of Ce (i.e., p=1 and x=0.001 to 0.5 in the formula);

$LnBr_3$, which may be doped with 0.1 to 50 mol % of Ce (i.e., p=1 and x=0.001 to 0.5 in the formula);

$LaBr_3$, which may be doped with 0.1 to 50 mol % of Ce (i.e., p=1 and x=0.001 to 0.5 in the formula);

$GdBr_3$, which may be doped with 0.1 to 50 mol % of Ce (i.e., p=1 and x=0.001 to 0.5 in the formula);

$La_zLn_{(1-z)}X_3$, which may be doped with 0.1 to 50 mol % of Ce (i.e., p=1 and x=0.001 to 0.5 in the formula), z possibly varying from 0 to 1, Ln being a rare earth different from La, X being a halogen as mentioned previously;

$La_zGd_{(1-z)}Br_3$, which may be doped with 0.1 to 50 mol % of Ce (i.e., p=1 and x=0.001 to 0.5 in the formula), z possibly varying from 0 to 1;

$La_zLu_{(1-z)}Br_3$, which may be doped with 0.1 to 50 mol % of Ce (i.e., p=1 and x=0.001 to 0.5 in the formula), z possibly varying from 0 to 1;

$Ln_zLn''_{(1-z)}X_{3(1-y)}X'_{3y}$ in which Ln and Ln" are two different rare earths, X and X' being two different halogens, in particular Cl, Br or I, z possibly varying from 0 to 1, and y possibly varying from 0 to 1;

$RbGd_2Br_7$, which may be doped with 0.1 to 50 mol % of Ce (i.e., n=1, p=2 and x=0.002 to 1 in the formula);

$RbLn_2Cl_7$, which may be doped with 0.1 to 50 mol % of Ce (i.e., n=1, p=2 and x=0.002 to 1 in the formula);

$RbLn_2Br_7$, which may be doped with 0.1 to 50 mol % of Ce (i.e., n=1, p=2 and x=0.002 to 1 in the formula);

$CsLn_2Cl_7$, which may be doped with 0.1 to 50 mol % of Ce (i.e., n=1, p=2 and x=0.002 to 1 in the formula);

$CsLn_2Br_7$, which may be doped with 0.1 to 50 mol % of Ce (i.e., n=1, p=2 and x=0.002 to 1 in the formula);

$K_2LaCl_5$, which may be doped with 0.1 to 50 mol % of Ce (i.e., n=2, p=1 and x=0.001 to 0.5 in the formula);

$K_2LaI_5$, which may be doped with 0.1 to 50 mol % of Ce (i.e., n=2, p=1 and x=0.001 to 0.5 in the formula);

$Cs_{(2-z)}Rb_zLiLnX_6$, where X is either Cl or Br or I, Ln is Y or Gd or Lu or Sc or La, where z is greater than or equal to 0 and less than or equal to 2. Crystals which may be doped with various molar percents of Ce (i.e., n=3, p=1 and $0.0005 \leq x < 1$ in the formula).

Thus, the scintillator material may especially comprise lanthanum chloride, lanthanum bromide, or any combination thereof.

In particular embodiments, the coating has the following advantages:

no notable chemical interaction with the scintillating material, and preservation over time of the quality of the scintillator, in particular of the scintillator/paint interface;

its mechanical properties are compatible with those of the scintillating material (adherence, elasticity making it possible to absorb thermal expansions of the crystal without the coating cracking or detaching), and are long-lasting;

an opacity (or gray level, or whiteness) that can be adjusted to the application by variation of the level(s) and/or the material of the pigment (black or white); and there is good coupling between the optical indices of the scintillator material and of the absorber, which is favorable to a good absorption (in the case of the black coating) or the reflection of the light (in the case of the white coating).

Thus, the pigment within the layer can be black to the naked eye, or white to the naked eye, or gray to the naked eye.

The layer as described herein has good adhesion properties. Unlike a particular embodiment as described herein, U.S. Pat. No. 3,745,359 teaches a NaI crystal having lateral faces that are beveled and coated with a thin layer of lamp-black. This type of coating does not however adhere very well, is not very consistent and is difficult to apply. The compatibility of this coating with a hygroscopic scintillator is neither demonstrated nor mentioned.

Unexpectedly, the adhesion of the coating was better to a polished crystal surface than to a rough crystal surface (in particular that has been roughened by scratching with sandpaper or an abrasive powder containing diamond or corundum for example), which goes completely against the customary approach of a person skilled in the art of coating. This is because, it is customary to roughen a surface before applying a coating in order to produce mechanical anchoring of the layer. Furthermore, with a polished crystalline surface, the absorption or the reflection by a respectively black or white coating is more effective. Specifically, it has been realized that a rough surface leads, depending on the pigment (black or white), to a less markedly black or less markedly white color than with a polished surface.

The interface between the layer and the scintillator material can be polished.

The surface of the scintillator material may comprise a region that is not coated with the layer as described herein. This is especially the case for the face of the scintillator coupled to the photodetector. For an ionizing-radiation detector comprising the scintillator material as described herein, the scintillator material is coupled, via a region of the surface that is not coated with said layer, to a photodetector. In the case of an imager such as a gamma camera, the coating loaded with absorbent pigment is applied to the lateral faces of the scintillator material. The face opposite that which is coupled with the photodetector (the face furthest away from the photoreceptor) can have a reflective material, such as PTFE or a coating as described herein produced by mixing an anhydrous resin (such an epoxy or silicone adhesive) and a reflective pigment, such as a white pigment. However, the absorber may be applied to all the faces (except that coupled to the photodetector) for example in applications where it is desired to determine, with precision, the depth of the interaction of the ionizing radiation in the scintillator.

It has already been seen that standard paints were not suitable, as they can contain moisture and thus etch into the scintillator. Anhydrous resins, especially epoxy or silicone resins, appear less reactive with the scintillator. These resins are generally liquid when they are not polymerized, and contain at least two components (a matrix and a hardener). In order to activate the setting, the components are mixed. The polymerization or cross-linking then in general takes a few hours, and may be accelerated by heating.

An exemplary epoxy resin is a two-component resin sold under the reference ARALDITE CY™-brand resin by Huntsman. An exemplary silicone resin is a two-component resin sold under the reference DOW CORNING 93-500™-brand resin.

As the white pigment, barium sulfate gives a greater reflectivity to the coating than titanium oxide.

The rare-earth halides have good scintillating properties, but they can be hygroscopic. U.S. Pat. No. 6,452,186 teaches a set of scintillator crystals that act as an electromagnetic radiation detector. The various crystals have a reflective layer on one face, an absorber material of molybdenum plate type on the lateral faces and a partially absorbent material as an intermediate layer between the crystal and the photodetector. This intermediate layer is an adhesive layer and contains carbon black. This layer contains sufficiently little carbon black in order not to attenuate the light passing through it too much. The scintillator in U.S. Pat. No. 6,452,186 ($CdWO_4$) is not hygroscopic.

US 2008/0308739 teaches a detector comprising a light-emitting layer containing carbon black and a binder of cyanoethyl cellulose type. The scintillators mentioned are either non-hygroscopic, or very slightly hygroscopic.

In a particular embodiment, the layer as disclosed herein is particularly well suited for a hygroscopic scintillating material. Therefore, a rare-earth halide can be used as a scintillating material without adverse effects, should the scintillating material be coated with a light reflecting or absorbing material.

In an embodiment, a detector can comprise a scintillator material as described herein. The detector can be used, in particular, in the fields of medical imaging (imaging of organs such as cardiac imaging, mammography, small-animal imaging). Alternatively, the detector may be used in metrology (depth of interaction, flash radiography). It is observed that such a detector withstands at least temperature conditions between −20° C. and +50° C. at 8° C./hour without impairment. The detector comprises the coated crystal as described herein, the crystal being coupled to a photodetector. The photodetector may be:

one or one set of photomultiplier tube(s) (PMTS);
one or one set of multi-anode photomultiplier tube(s) (PS PMT for position sensitive photomultiplier); and
a photodiode, a set of photodiodes, or a photodiode array. The term photodiode comprises, inter alia, PN photodiode, PiN photodiode, avalanche photodiode (APD), avalanche photodiode operating in Geiger mode (named, for example, a silicon photomultiplier (SiPM), or multichannel photon counter (MPPC)), or silicon drift diode (SDD).

The coupling of the crystal to the photodetector can be carried out via a region of the surface of the crystal that is not coated with the layer. In general, the coupling surface (or region) is planar. The region of the surface of the crystal opposite that of the coupling, when it is coated, can be coated with a reflective material, such as a PTFE type or of the type of the layer described herein and be filled with a white pigment. The scintillating crystal may have a cylindrical or parallelepipedal shape. For these two types of shapes, the crystal has two opposite planar faces, one being coupled to the photodetector, the other being capable of being coated with a reflective material.

FIG. 1 illustrates a portion of a detector seen in cross section. The detector comprises a scintillator crystal 1 coupled via one of its faces (region of the surface of the crystal that is not coated) to a photodetector 2. Optical coupling 6 is between the crystal 1 and the photodetector 2. This coupling is a pigment-free (therefore transparent) layer, such as grease or a silicone or epoxy resin. The lateral faces of the scintillator are coated with an absorbing coating (4, 5) as described herein, filled with carbon black. The face opposite the face coupled to the photodetector 2 is coated with a reflective coating 3 made of PTFE. This assembly is encapsulated in a hermetic housing (not represented) sized for the conditions of use. The detector can be preceded by a collimator placed in front of the radiation input window. On the other side, the photodetector is coupled to a signal processing unit. The various elements represented in the FIGURE are not to scale.

Example 1

14 g of components of ARALDITE-Brand™-brand epoxy adhesive are mixed. After mixing the components and before the epoxy adhesive, 0.25 g of lampblack carbon powder (sold by Fisher Chemicals) is introduced gradually into the liquid epoxy adhesive until a homogeneous mixture is obtained. The liquid epoxy adhesive and lampblack carbon is mixed slowly to avoid introducing bubbles. Once the homogeneous mixture is obtained, it is degassed by leaving it for about ten minutes in a vacuum chamber. The residual bubbles are then extracted. The adhesive is cured by heating it via baking for 1 hour at a temperature of 60° C., then left to cool for 30 min in dry air. Once cooled, a brush is dipped into the mixture, and applied to the polished scintillator. The mixture is, in the proportions chosen, sufficiently fluid in order to be removed and spread with a brush, but viscous enough to adhere to the surface of the crystal and not to run. This mixture contains less than 100 ppm by weight of water.

Once the faces are treated, the scintillator is left for 24 hours in dry air, so that the coating finishes setting. It then adheres well to the scintillator without being tacky on the outside which allows the assembly to be handled. No bubbles or thickness inhomogeneities, or shrinkage form or occurs during the setting period.

Example 2

The procedure of example 1 is followed except that the crystalline surface is roughened with 280 grade sandpaper before application of the mixture. The final coating appears less black than for example 1.

Example 3

The procedure of example 1 is followed except that the pigment is $TiO_2$. The final coating is very white and adheres well to the scintillator without being tacky on the outside which allows the assembly to be handled. No bubbles, thickness inhomogeneities or shrinkage form or occurs during the setting period.

Example 4

The procedure of example 3 is followed except that the crystalline surface is roughened with 280 grade sandpaper before application of the mixture. The final coating appears less white (slightly gray) than for example 3.

While embodiments of the present invention have been described above with particularity, it is well understood in the art that one of ordinary skill may make modifications and still be within the scope of the present claims.

The invention claimed is:

1. A scintillator material comprising a rare-earth halide coated with a layer comprising a resin and a pigment, wherein the layer comprises 0.01 to 20% by weight of pigment.

2. The material as claimed in claim 1, wherein the resin is an epoxy or silicone resin.

3. The material as claimed in claim 1, wherein the thickness of the layer is between 10 µm; and 5 mm.

4. The material as claimed in claim 1, wherein the rare-earth halide comprises lanthanum chloride or lanthanum bromide.

5. The material as claimed in claim 1, wherein its surface comprises a region that is not coated by the layer.

6. The material as claimed in claim 1, wherein the pigment and the layer which contains it are black to the naked eye.

7. The material as claimed in claim 1, wherein the pigment and the layer that contains it are white to the naked eye.

8. The material as claimed in claim 1, wherein the pigment and the layer which contains it are gray to the naked eye.

9. The material as claimed in claim 1, wherein the layer is partially transparent.

10. The material as claimed in claim 1, wherein the interface between the layer and the scintillator material has been polished.

11. The material as claimed in claim 1, wherein the resin is an epoxy or silicone resin, the thickness of the layer is between 10 µm and 5 mm, the rare-earth halide comprises lanthanum chloride or lanthanum bromide, and its surface comprises a region that is not coated by the layer.

12. The material as claimed in claim 11, wherein the interface between the layer and the scintillator material has been polished.

13. An ionizing-radiation detector comprising the scintillator material from claim 11, said scintillator material being coupled, via a region of the surface that is not coated by said layer, to a photodetector.

14. A process for manufacturing the scintillator material from claim 11, comprising the application of a homogeneous mixture of an adhesive resin and a pigment to the surface of the scintillator material containing less than 1% by weight of water.

15. The process as claimed in claim 14, wherein the mixture contains less than 100 ppm by weight of water.

16. The process as claimed in claim 14, wherein the surface of the material onto which the mixture is applied is polished.

17. An ionizing-radiation detector comprising the scintillator material from claim 1, said scintillator material being coupled, via a region of the surface that is not coated by said layer, to a photodetector.

18. A gamma camera comprising the detector from claim 17.

19. A process for manufacturing a scintillator material comprising:
providing a rare-earth halide; and
coating the rare-earth halide with a layer by applying a homogeneous mixture of an adhesive resin and a pigment to the surface of the scintillator material containing less than 1% by weight of water.

20. The process as claimed in claim 19, wherein the surface of the material onto which the mixture is applied is polished.

21. The material as claimed in claim 19, wherein the resin is an epoxy or silicone resin.

22. The material as claimed in claim 19, wherein the thickness of the layer is between 10 µm and 5 mm.

23. The material as claimed in claim 19, wherein the rare-earth halide comprises lanthanum chloride or lanthanum bromide.

24. The material as claimed in claim 19, wherein its surface comprises a region that is not coated by the layer.

25. The material as claimed in claim 19, wherein the pigment and the layer which contains it are black to the naked eye.

26. The material as claimed in claim 19, wherein the pigment and the layer that contains it are white to the naked eye.

27. The material as claimed in claim 19, wherein the pigment and the layer which contains it are gray to the naked eye.

28. The material as claimed in claim 19, wherein the layer comprises 0.01 to 20% by weight of pigment.

29. The material as claimed in claim 19, wherein the layer is partially transparent.

30. The material as claimed in claim 19, wherein the interface between the layer and the scintillator material has been polished.

31. The material as claimed in claim 19, wherein the resin is an epoxy or silicone resin, the thickness of the layer is between 10 µm and 5 mm, the rare-earth halide comprises lanthanum chloride or lanthanum bromide, and its surface comprises a region that is not coated by the layer.

32. The material as claimed in claim 31, wherein the interface between the layer and the scintillator material has been polished.

33. An ionizing-radiation detector comprising the scintillator material from claim 31, said scintillator material being coupled, via a region of the surface that is not coated by said layer, to a photodetector.

34. A process for manufacturing the scintillator material from claim 31, comprising the application of a homogeneous mixture of an adhesive resin and a pigment to the surface of the scintillator material containing less than 1% by weight of water.

35. The process as claimed in claim 34, wherein the mixture contains less than 100 ppm by weight of water.

36. The process as claimed in claim 34, wherein the surface of the material onto which the mixture is applied is polished.

37. An ionizing-radiation detector comprising the scintillator material from claim 19, said scintillator material being coupled, via a region of the surface that is not coated by said layer, to a photodetector.

38. A gamma camera comprising the detector from claim 37.

39. The process as claimed in claim 19, wherein the mixture contains less than 100 ppm by weight of water.

40. A scintillator material comprising a rare-earth halide coated with a layer comprising a resin and a pigment, wherein the layer is in direct contact with the rare-earth halide.

41. The material as claimed in claim 40, wherein the resin is an epoxy or silicone resin, the thickness of the layer is between 10 µm and 5 mm, the rare-earth halide comprises lanthanum chloride or lanthanum bromide, and its surface comprises a region that is not coated by the layer.

42. The material as claimed in claim 41, wherein the interface between the layer and the scintillator material has been polished.

43. An ionizing-radiation detector comprising the scintillator material from claim 41, said scintillator material being coupled, via a region of the surface that is not coated by said layer, to a photodetector.

44. A gamma camera comprising the detector from claim 43.

45. A process for manufacturing the scintillator material from claim 41, comprising the application of a homogeneous mixture of an adhesive resin and a pigment to the surface of the scintillator material containing less than 1% by weight of water.

46. The process as claimed in claim 45, wherein the mixture contains less than 100 ppm by weight of water.

47. The process as claimed in claim 45, wherein the surface of the material onto which the mixture is applied is polished.

48. The material as claimed in claim 40, wherein the resin is an epoxy or silicone resin.

49. The material as claimed in claim 40, wherein the thickness of the layer is between 10 µm and 5 mm.

50. The material as claimed in claim 40, wherein the rare-earth halide comprises lanthanum chloride or lanthanum bromide.

51. The material as claimed in claim 40, wherein its surface comprises a region that is not coated by the layer.

52. The material as claimed in claim 40, wherein the pigment and the layer which contains it are black to the naked eye.

53. The material as claimed in claim 40, wherein the pigment and the layer that contains it are white to the naked eye.

54. The material as claimed in claim 40, wherein the pigment and the layer which contains it are gray to the naked eye.

55. The material as claimed in claim 40, wherein the layer comprises 0.01 to 20% by weight of pigment.

56. The material as claimed in claim 40, wherein the layer is partially transparent.

57. The material as claimed in claim 40, wherein the interface between the layer and the scintillator material has been polished.

58. An ionizing-radiation detector comprising the scintillator material from claim 40, said scintillator material being coupled, via a region of the surface that is not coated by said layer, to a photodetector.

59. A process for manufacturing the scintillator material from claim 40, comprising the application of a homogeneous mixture of an adhesive resin and a pigment to the surface of the scintillator material containing less than 1% by weight of water.

60. The process as claimed in claim 59, wherein the mixture contains less than 100 ppm by weight of water.

61. The process as claimed in claim 59, wherein the surface of the material onto which the mixture is applied is polished.

\* \* \* \* \*